United States Patent
Fukuzono et al.

(10) Patent No.: US 12,457,144 B2
(45) Date of Patent: Oct. 28, 2025

(54) WIRELESS COMMUNICATION SYSTEM, WIRELESS COMMUNICATION METHOD, CENTRALIZED CONTROL DEVICE, AND WIRELESS COMMUNICATION PROGRAM

(71) Applicant: NTT, Inc., Tokyo (JP)

(72) Inventors: Hayato Fukuzono, Musashino (JP); Keita Kuriyama, Musashino (JP); Masafumi Yoshioka, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 5 days.

(21) Appl. No.: 18/688,368

(22) PCT Filed: Sep. 3, 2021

(86) PCT No.: PCT/JP2021/032441
§ 371 (c)(1),
(2) Date: Mar. 1, 2024

(87) PCT Pub. No.: WO2023/032154
PCT Pub. Date: Mar. 9, 2023

(65) Prior Publication Data
US 2024/0406051 A1   Dec. 5, 2024

(51) Int. Cl.
*H04L 27/34* (2006.01)

(52) U.S. Cl.
CPC .................. *H04L 27/34* (2013.01)

(58) Field of Classification Search
CPC .............. H04L 27/34; H04L 27/26
See application file for complete search history.

(56) References Cited

U.S. PATENT DOCUMENTS

2022/0394547 A1 * 12/2022 Ji ................... H04L 1/0065

FOREIGN PATENT DOCUMENTS

JP        2017-059889 A      3/2017
WO    WO-2007084898 A2 *  7/2007   .............. H04K 1/10

OTHER PUBLICATIONS

Ibnkahla et al., "High-Speed Satellite Mobile Communications: Technologies and Challenges", Proceedings of the IEEE, vol. 92, No. 2, Feb. 2004, pp. 312-339.

* cited by examiner

*Primary Examiner* — Jean B Corrielus
(74) *Attorney, Agent, or Firm* — XSENSUS LLP

(57) ABSTRACT

A system including a plurality of base stations and terminal stations. A base station includes a transmission signal amplifier enabled to vary transmission power, provides a specification regarding an input-output characteristic of the transmission signal amplifier to a terminal station, and provides transmission power to the terminal station. The terminal station estimates a constellation of a signal points on the basis of the transmission power and the specification, detects a coordinate point on constellation coordinates, of a reception signal, and detects interference power received from base stations and that are not communication partners. Further, a reception point is calculated in which an influence of the interference power is reflected on the coordinate point, and a likelihood with the signal points is calculated for the reception point. Then, a symbol intended by the reception signal is specified on the basis of a calculation result of the likelihood.

8 Claims, 12 Drawing Sheets

WIRELESS COMMUNICATION SYSTEM, WIRELESS COMMUNICATION METHOD, CENTRALIZED CONTROL DEVICE, AND WIRELESS COMMUNICATION PROGRAM

CROSS-REFERENCE TO RELATED APPLICATION

This application is a national stage application, pursuant to 35 U.S.C. § 371, of International Patent Application No. PCT/JP2021/032441, filed Sep. 3, 2021, the entire contents of which are incorporated herein by reference.

TECHNICAL FIELD

The present disclosure relates to a wireless communication system, a wireless communication method, a centralized control device, and a wireless communication program, and more particularly, to a wireless communication system, a wireless communication method, a centralized control device, and a wireless communication program using a single-carrier multi-value modulation scheme.

BACKGROUND ART

Non Patent Literature 1 below discloses a technique related to a wireless communication system using a single-carrier multi-value modulation scheme. In wireless communication using a single-carrier multi-value modulation scheme, a signal to noise ratio (SNR) can be increased as transmission power is increased.

On the other hand, an amplifier of a transmission signal exhibits a linear input-output characteristic in a region where input power is small, but generally exhibits a non-linear characteristic in a region where the power is large. For this reason, in the wireless communication, as the transmission power increases, distortion is more likely to occur in the transmission signal.

To avoid an influence of such distortion, Non Patent Literature 1 discloses a technique for keeping transmission power within a linear region of an amplifier. In this case, since distortion is not superimposed on the transmission signal, it is possible to correctly process the signal in the reception device, and it is possible to effectively prevent erroneous transmission of data.

In addition, as a technique for avoiding the problem of distortion due to an increase in transmission power, a technique disclosed in Patent Literature 1 below is known. In a case where an Amplitude and Phase-Shift Keying (APSK) method is used as the modulation scheme, for example, a phase shift occurs in the transmission signal with a change in the AM/PM characteristic in a region where the input power is large. Patent Literature 1 discloses a technique for dealing with such a phase shift.

FIG. 1 is a diagram for explaining an outline of the technique disclosed in Patent Literature 1. More specifically, FIG. 1 illustrates a constellation corresponding to 32 APSK. In the 32 APSK, 32 symbols indicated by ○ or ● in the figure are defined by changing the amplitude and phase of the transmission signal. More specifically, four symbols are defined on a first inner circumference 10, twelve symbols are defined on a second inner circumference 12, and sixteen symbols are defined on an outermost circumference 14.

Patent Literature 1 discloses that one or more pilot signals 16 are arranged on each of the first inner circumference 10, the second inner circumference 12, and the outermost circumference 14. A position of each pilot signal 16 is shared between a transmission device and a reception device. For this reason, the reception device can detect a phase shift generated in each of concentric circles on the basis of a shift between a position of the pilot signal 16 actually received and the position shared in advance.

Then, for example, in a case where a signal belonging to the first inner circumference 10 is received, a phase shift occurring in the first inner circumference 10 is reflected in the signal. In a case where signals belonging to other concentric circles are received, phase shifts are corrected in the same manner. According to such a method, even when a phase shift occurs in a reception signal in a region where transmission power is large, the phase shift can be appropriately corrected to prevent erroneous transmission of data.

CITATION LIST

Non Patent Literature

Non Patent Literature 1: High-Speed Satellite Mobile Communications: Technologies and Challenges, MOHAMED IBNKAHLA, QUAZI MEHBUBAR RAHMAN, AHMED IYANDA SULYMAN, HISHAM ABDULHUSSEIN AL-ASADY, JUN YUAN, AND AHMED SAFWAT, p 312-339, PROCEEDINGS OF THE IEEE, VOL. 92, NO. 2, February 2004

Patent Literature

Patent Literature 1: JP 2017-59889 A

SUMMARY OF INVENTION

Technical Problem

However, the technique of Non Patent Literature 1 solves the problem of distortion by giving up use of a non-linear region of the amplifier. That is, in this technique, the amplifier cannot sufficiently exhibit its original capability, and there occurs a situation against an essential requirement of using large power without excessive capital investment.

In addition, the transmission device and the reception device may be placed in a dense environment. Under such an environment, interference power from other cells may reach the reception device in addition to a signal from the transmission device of a communication partner. Then, under an environment in which interference power from other cells reaches, erroneous recognition of data is likely to occur in the reception device due to an influence of the interference power. The technique of Non Patent Literature 1 described above cannot provide any solution to a problem caused by such interference power.

In the technique of Patent Literature 1, the transmission device needs to transmit at least the same number of pilot signals as the number of concentric circles constituting the constellation to the reception device. Then, an environment of a communication path of a wireless signal is not always constant. For this reason, the pilot signals need to be executed frequently, preferably for each of data communication flows.

Further, in the technique described in Patent Literature 1, when quadrature amplitude modulation (QAM) is used as a modulation scheme, for example, it is necessary to transmit a larger number of pilot signals. That is, as described in Patent Literature 1, if the modulation scheme is APSK, a plurality of symbols arranged on concentric circles can be corrected with one common phase shift. Thus, the number of required pilot signals is one for the plurality of symbols arranged on the concentric circles.

On the other hand, in the case of QAM, arrangement of symbols in the constellation is in a lattice pattern. For example, symbols of 4×4=16 or 8×8=64 are arranged in a lattice pattern on the constellation. In this case, even if one pilot signal can be shared by several symbols, it is necessary to prepare a large number of pilot signals to appropriately correct all the symbols.

If a large number of pilot signals are exchanged for each of communication flows, a data rate inevitably decreases. In this respect, the technique described in Patent Literature 1 enables use of large power corresponding to a capability of the amplifier, but still leaves room for improvement in terms of the data rate.

Further, the technique described in Patent Literature 1 cannot provide any solution to the above problem caused by interference power from other cells generated in a dense environment either.

The present disclosure has been made in view of the above problem, and a first object thereof is to provide a wireless communication system that does not cause erroneous transmission of data and ensures a high data rate even in a dense environment while utilizing a non-linear region of an amplifier.

In addition, a second object of the present disclosure is to provide a wireless communication method that does not cause erroneous transmission of data and ensures a high data rate even in a dense environment while utilizing a non-linear region of an amplifier.

In addition, a third object of the present disclosure is to provide a centralized control device capable of giving an instruction for transmission power satisfying a desired communication quality to a plurality of transmission devices placed in a dense environment while causing an amplifier included in the transmission device to utilize a non-linear region.

In addition, a fourth object of the present disclosure is to provide a wireless communication program for implementing a centralized control device capable of giving an instruction for transmission power satisfying a desired communication quality to a plurality of transmission devices placed in a dense environment while causing an amplifier included in the transmission device to utilize a non-linear region.

Solution to Problem

To achieve the above object, a first aspect is desirably a wireless communication system including a plurality of base stations and terminal stations that perform wireless communication by using a single-carrier multi-value modulation scheme, in which
each of the base stations includes
a transmission signal amplifier enabled to vary transmission power, and is configured to execute:
processing of providing a specification regarding an input-output characteristic of the transmission signal amplifier to each of the terminal stations; and
processing of providing transmission power used for data transmission to each of the terminal stations, and
each of the terminal stations is configured to execute:
signal point estimation processing of estimating a constellation of signal points on the basis of the transmission power and the specification;
processing of detecting a coordinate point on constellation coordinates, of a reception signal;
processing of detecting interference power received from a base station that is not a communication partner;
processing of calculating a reception point in which an influence of the interference power is reflected on the coordinate point;
processing of calculating a likelihood with the signal points for the reception point; and
processing of specifying a symbol intended by the reception signal on the basis of a calculation result of the likelihood.

In addition, a second aspect is desirably a wireless communication method using a plurality of base stations and terminal stations that perform wireless communication by using a single-carrier multi-value modulation scheme,
each of the base stations including a transmission signal amplifier enabled to vary transmission power,
the wireless communication method including:
a step of providing a specification regarding an input-output characteristic of the transmission signal amplifier from each of the base stations to each of the terminal stations;
a step of providing transmission power used by each of the base stations for data transmission to each of the terminal stations;
a signal point estimation step, by each of the terminal stations, of estimating a constellation of signal points on the basis of the transmission power and the specification;
a step, by each of the terminal stations, of detecting a coordinate point on constellation coordinates, of a reception signal;
a step, by each of the terminal stations, of detecting interference power received from a base station that is not a communication partner;
a step, by each of the terminal stations, of calculating a reception point in which an influence of the interference power is reflected on the coordinate point;
a step, by each of the terminal stations, of calculating likelihood with the signal points for the reception point; and
a step, by each of the terminal stations, of specifying a symbol intended by the reception signal on the basis of a calculation result of the likelihood.

In addition, a third aspect is desirably a centralized control device that controls a wireless communication system including a plurality of base stations and terminal stations that perform wireless communication by using a single-carrier multi-value modulation scheme, in which
each of the base stations includes a transmission signal amplifier enabled to vary transmission power, and is configured to execute: processing of providing a specification regarding an input-output characteristic of the transmission signal amplifier to each of the terminal stations; and processing of providing transmission power used for data transmission to each of the terminal stations, and
each of the terminal stations is configured to execute: signal point estimation processing of estimating a constellation of signal points on the basis of the transmission power and the specification; processing of detecting a coordinate point on constellation coordinates, of a reception signal; processing of detecting interference power received from a base station that is not a communication partner; processing of calculating a reception point in which an influence of the interference power is reflected on the coordinate point; processing of calculating likelihood with the signal points for the reception point; processing of specifying a symbol intended by the reception signal on the basis of a calculation result of the likelihood; and processing of calculating an error rate of the reception signal, the centralized control device being configured to execute:

processing of changing patterns of transmission power for the plurality of base stations;

processing of collecting the error rate corresponding to each of the patterns; and processing of determining a command for transmission power to be given to each of the plurality of base stations such that all of the error rates collected satisfy a predetermined requirement.

In addition, a fourth aspect is desirably a wireless communication program for implementing the centralized control device according to the third aspect, the wireless communication program including a program for causing an arithmetic processing unit included in the centralized control device to execute:

processing of changing patterns of transmission power for the plurality of base stations;

processing of collecting the error rate corresponding to each of the patterns; and processing of determining a command for transmission power to be given to each of the plurality of base stations such that all of the error rates collected satisfy a predetermined requirement.

Advantageous Effects of Invention

According to the first to fourth aspects, it is possible to ensure a high data rate without causing erroneous transmission of data even in a dense environment while utilizing a non-linear region of an amplifier.

DESCRIPTION OF EMBODIMENTS

First Embodiment

[Overall Configuration of First Embodiment]

Figure 1:
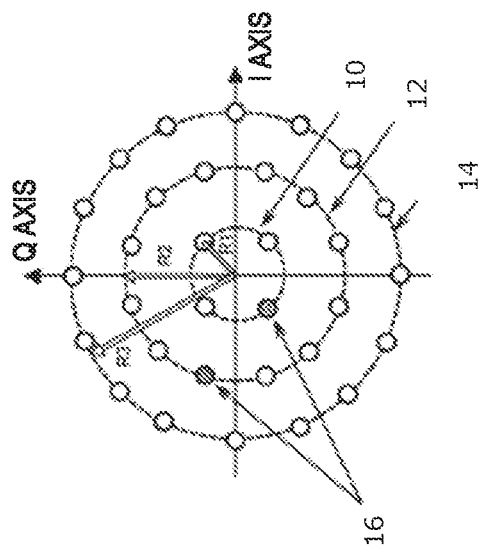
FIG. 1 is a diagram for explaining an outline of a technique disclosed in Patent Literature 1.
Figure 2:
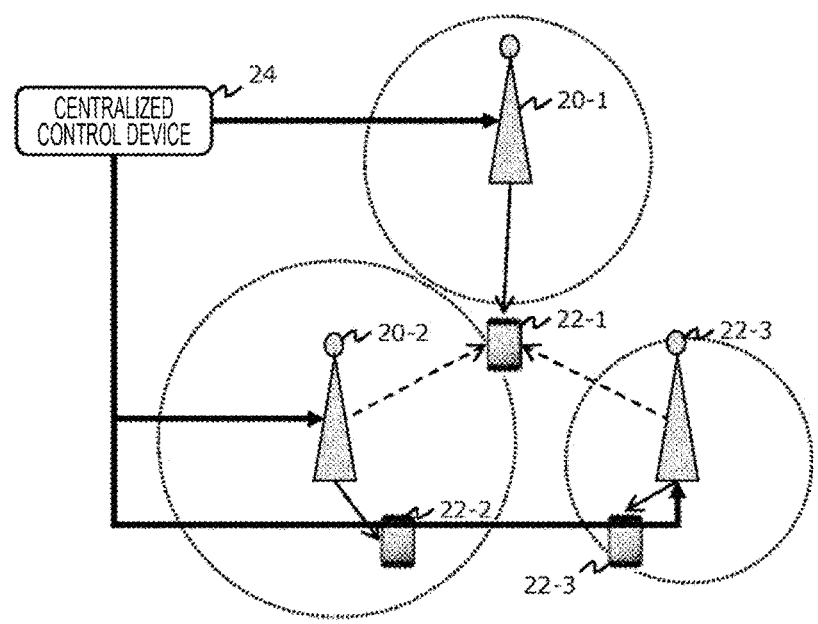
FIG. 2 is a diagram for explaining an overall configuration of a wireless communication system of a first embodiment of the present disclosure.

FIG. 2 illustrates an overall configuration of a wireless communication system of a first embodiment of the present disclosure. As illustrated in FIG. 2, the wireless communication system of the present embodiment includes base stations 20-1 to 20-3. Hereinafter, in a case where it is not necessary to distinguish them from each other, they are referred to as "base station 20" with indexes of reference signs omitted.

FIG. 2 illustrates terminal stations 22-1 to 22-3 in a communication state with the respective base stations 20. Also for these terminals, in a case where it is not necessary to distinguish them from each other, they are referred to as "terminal stations 22" with indexes of reference signs omitted.

More specifically, FIG. 2 illustrates a state in which the terminal station 22-1 is located near a boundary of communication areas of the three base stations 20. In the state illustrated in FIG. 2, the terminal station 22-1 establishes communication with the base station 20-1 as indicated by a solid arrow in the figure. In addition, interference power from other cells reaches the terminal station 22-1 as indicated by a dashed arrow in the figure.

The wireless communication system of the present embodiment also includes a centralized control device 24. The centralized control device 24 has the three base stations 20 illustrated in FIG. 2 under its control, and can give a command for transmission power to each of the three base stations 20. In addition, the centralized control device 24 can receive information such as a bit error rate (BER) or a symbol error rate (SER) from the terminal station 22 via the base station 20. Hereinafter, for convenience, an error rate treated in the present embodiment is BER, but the present disclosure is not limited thereto, and SER may be treated instead of BER or together with BER.

[First Problem Focused on by First Embodiment]

Figure 3:
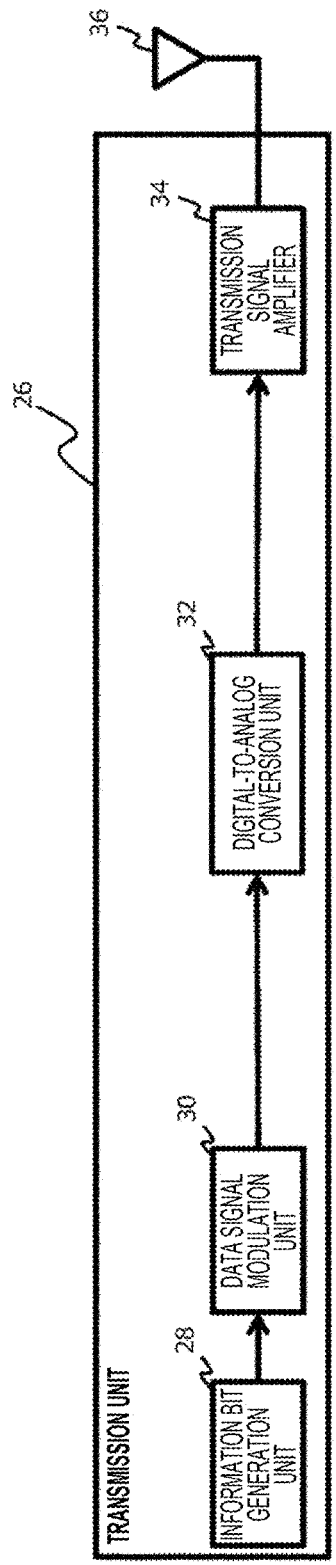
FIG. 3 is a diagram for explaining a configuration of a base station to be compared with a base station in the first embodiment of the present disclosure.

FIG. 3 is a block diagram for explaining a configuration of a base station 26 to be compared with the base station 20 in the present embodiment. The base station 26 of a comparative example includes an information bit generation unit 28. The information bit generation unit 28 generates information bits to be transmitted to the terminal station 22. The information bit generation unit 28 may have an error correction coding function or an interleaving function.

The information bits generated by the information bit generation unit 28 are provided to a data signal modulation unit 30. The data signal modulation unit 30 modulates the provided information bits into a data signal. As a modulation scheme, for example, a modulation scheme is considered that can be used for a single-carrier multi-value modulation scheme such as quadrature amplitude modulation (QAM) or APSK.

The data signal generated by the data signal modulation unit 30 is provided to a digital-to-analog conversion unit 32.

The digital-to-analog conversion unit 32 converts the digitally-modulated data signal into an analog transmission signal.

The transmission signal generated by the digital-to-analog conversion unit 32 is provided to a transmission signal amplifier 34. The transmission signal amplifier 34 amplifies the transmission signal and provides the amplified signal to an antenna 36. Then, the transmission signal is transmitted from the antenna 36 to the terminal station 22 in a form of a wireless signal.

Figure 4:
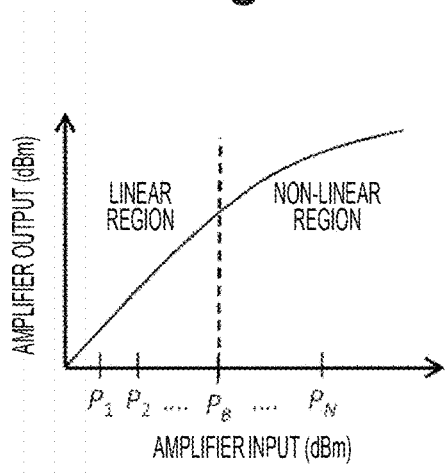
FIG. 4 is a diagram illustrating an input-output characteristic of an amplifier built in a base station.

FIG. 4 illustrates an input-output characteristic of the transmission signal amplifier 34. As illustrated in FIG. 4, in a region where input power (horizontal axis) is smaller than $P_B$, output power (vertical axis) of the transmission signal amplifier 34 is proportional to the input power. Then, in a region where the input power exceeds $P_B$, a proportional relationship between them collapses. Hereinafter, a region where they have the proportional relationship is referred to as a "linear region", and a region where the proportional relationship between them collapses is referred to as a "non-linear region".

Figure 5:
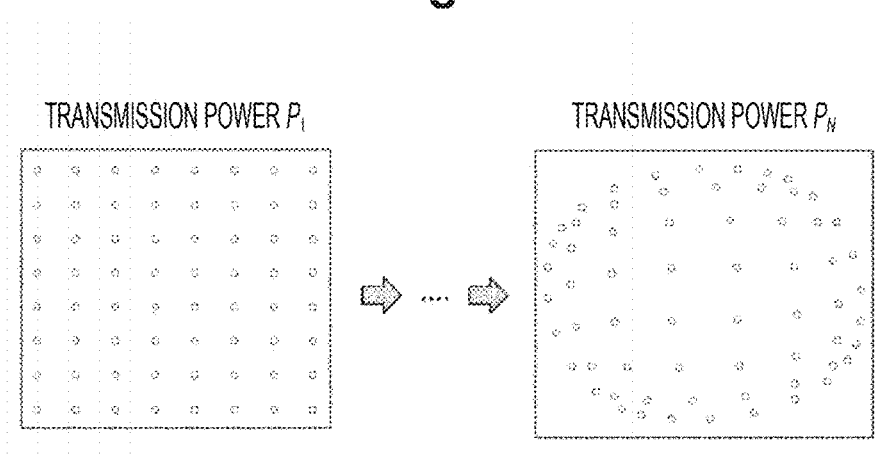
FIG. 5 is a diagram illustrating a state in which distortion occurs in a constellation with an increase in transmission power.

FIG. 5 illustrates a state in which distortion occurs in a constellation of 8×8=64 QAM with an increase in transmission power. In the modulation scheme of 64 QAM, 64 symbols arranged in a lattice pattern are defined by changing and adjusting amplitudes of two carrier waves independent of each other. Hereinafter, a point on constellation coordinates at which each of the 64 symbols is defined is referred to as a "signal point". In addition, a point on the constellation coordinates of each data signal to be actually transmitted is referred to as a "reception point".

In the linear region of the transmission signal amplifier 34, as illustrated on the left side (transmission power $P_1$) of FIG. 5, reception points form a constellation without distortion. On the other hand, in the non-linear region of the transmission signal amplifier 34, as illustrated on the right side (transmission power $P_N$) Of FIG. 5, distortion is superimposed on the constellation of the reception points.

The terminal station 22 performs likelihood calculation with signal points existing in the vicinity for each of the reception points included in the transmission signal, and recognizes each of the reception points as any of the 64 symbols on the basis of a result of calculation. Note that the calculation of a likelihood can be executed by, for example, a method described in the following literature.

"On the Optimality of Bit Detection of Certain Digital Modulations", Marvin K. Simon and Ramesh Annavajjala, p 299-307, IEEE TRANSACTIONS ON COMMUNICATIONS, VOL. 53, NO. 2, February 2005

If the terminal station 22 performs the above likelihood calculation by using the signal points constituting the constellation without distortion, reception points generated in the linear region can be correctly recognized. However, since reception points generated in the non-linear region deviates from original positions on the constellation, the reception points cannot be correctly recognized. For this reason, when the transmission signal amplifier 34 uses the non-linear region, a situation may occur in which data is erroneously recognized in the terminal station 22.

When the transmission power is limited to the linear region of the transmission signal amplifier 34 by the base station 26 of the comparative example, it is possible to prevent distortion from occurring in the constellation of the reception points. Thus, if such a limitation is applied, it is possible to prevent erroneous recognition of data in the terminal station 22. However, in that case, a situation occurs in which an amplification capability of the transmission signal amplifier 34 cannot be sufficiently utilized.

Thus, in the present embodiment, a relationship between transmission power used by the transmission signal amplifier 34 and distortion caused in the constellation is grasped in advance, and the relationship is shared between the base station 20 and the terminal station 22 at a start of communication. For example, a specification of the transmission signal amplifier 34 is shared at the start of communication, and during the communication, the transmission power is transmitted from the base station 20 to the terminal station 22, and then the terminal station 22 is caused to reproduce a constellation corresponding to the transmission power to calculate the likelihood. According to such a method, even if distortion occurs in the constellation in the non-linear region, it is possible to effectively suppress erroneous recognition of data due to the distortion.

[Second Problem Focused on by First Embodiment]

Next, a second problem focused on by the present embodiment will be described.

Figure 6:
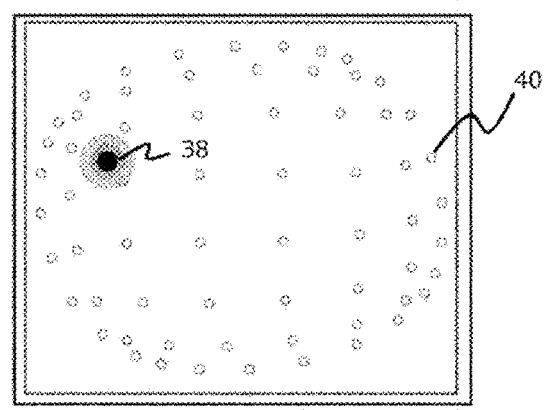
FIG. 6 is a diagram schematically illustrating an influence of interference power from other cells on accuracy of a reception point.

FIG. 6 is a diagram schematically illustrating an influence of interference power from other cells on accuracy of a reception point. Specifically, FIG. 6 illustrates a constellation with distortion reproduced by the terminal station 22 and a reception point 38 of a signal received by the terminal station 22 in an overlapping manner. A likelihood of the reception point 38 is calculated, for several signal points 40 located in the vicinity of the reception point 38, on the basis of a Euclidean distance between the reception point 38 and each signal point 40. Then, a signal point 40 at which the maximum likelihood is calculated is recognized as a signal intended by the reception point 38. For this reason, to correctly recognize data, it is desirable that a position of the reception point 38 is not blurred.

As described above, in the state illustrated in FIG. 2, in addition to a signal from the base station 20-1 of a communication partner, interference power from the other base stations 20-2 and 20-3 reaches the terminal station 22-1. Under such a state, a fluctuation due to the interference power occurs in an amplitude and a phase of the signal reaching the terminal station 22-1 from the base station 20-1. The reception point 38 illustrated in FIG. 6 illustrates a state in which an original position is blurred due to an influence of such fluctuation.

In FIG. 6, shading of a figure indicating the reception point 38 simulates a probability distribution of an amplitude and a phase of a signal constituting the reception point. In a case where the reception point 38 is in such a state, if coordinates at a certain time are specified as coordinates of the reception point 38 for likelihood calculation, the coordinates have an error. Then, if the likelihood calculation is performed on the basis of the coordinates, the nearest signal point 40 is erroneously recognized, and erroneous recognition of data may occur.

In the present embodiment, to prevent such erroneous recognition of data, the error caused by the interference power is equally superimposed on the position of the reception point 38, and then each of likelihoods with all adjacent signal points is calculated. As a result, only a likelihood for a specific signal point is not erroneously increased or decreased, and erroneous recognition of data in the terminal station 22 is effectively avoided.

[Features of First Embodiment]

Figure 7:
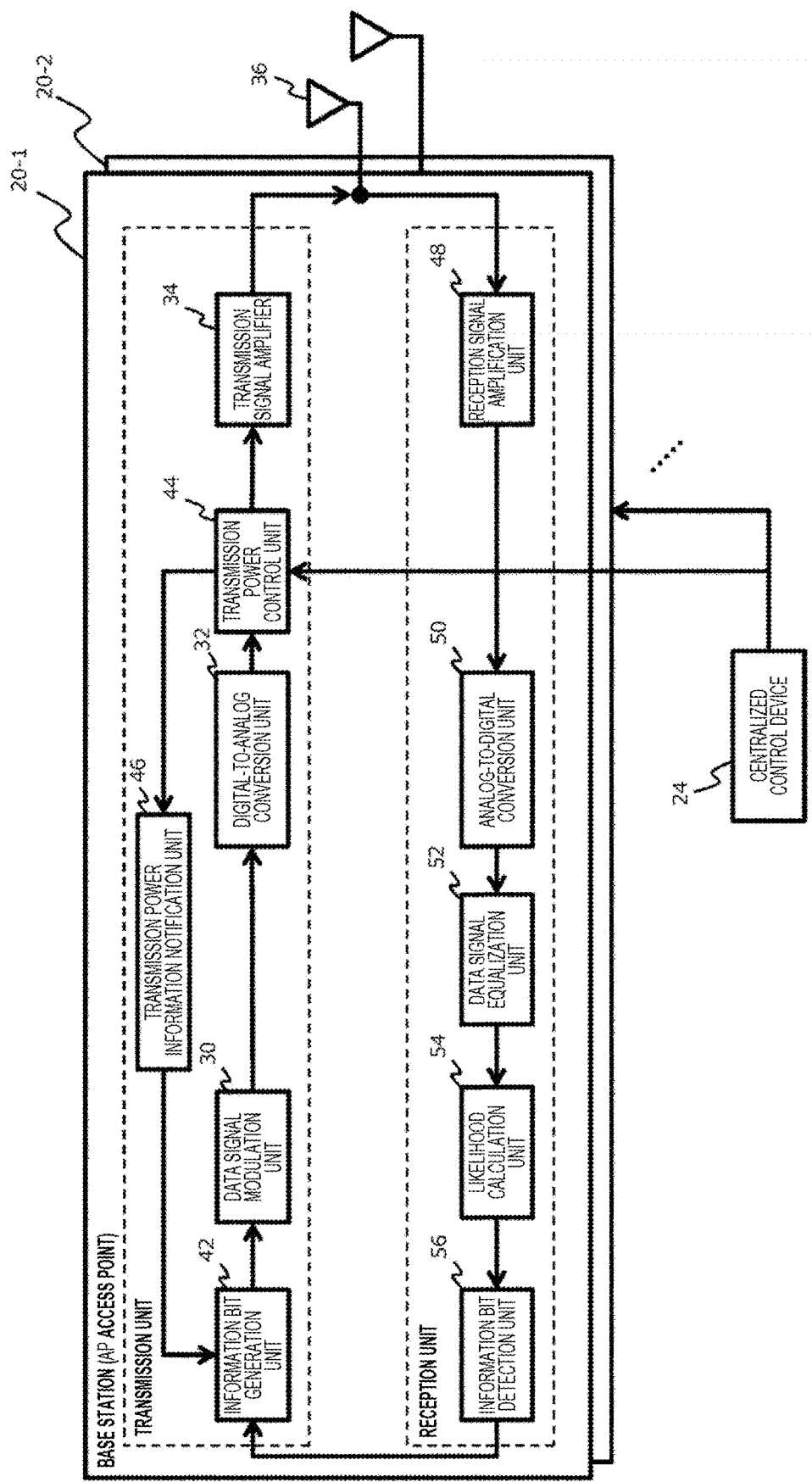
FIG. 7 is a block diagram for explaining a configuration of the base station in the first embodiment of the present disclosure.

FIG. 7 is a block diagram for explaining a configuration of the base station 20 in the present embodiment. Note that, in FIG. 7, the same elements as those included in the base station 26 of the comparative example (see FIG. 3) are denoted by the same reference signs, and description thereof will be omitted or simplified.

The base station 20 in the present embodiment includes a transmission unit illustrated in the upper part of FIG. 7. Here, the information bit generation unit 28 in the base station 26 of the comparative example is replaced with an information bit generation unit 42. The information bit generation unit 42 included in the present embodiment generates information bits regarding a specification of the base station 20 at a stage where communication between the base station 20 and the terminal station 22 is started. Specifically, a modulation scheme used by the base station 20 and the input-output characteristic of the transmission signal amplifier 34 (see FIG. 4) are converted into the information bits.

The information bits generated in this manner are transmitted from the base station 20 to the terminal station 22 at the stage where communication between the base station 20 and the terminal station 22 is started. For this reason, in the present embodiment, the modulation scheme used by the base station 20 and the input-output characteristic of the transmission signal amplifier 34 are shared between both stations when communication between both stations is started.

The base station 20 in the present embodiment includes a transmission power control unit 44 at a preceding stage of the transmission signal amplifier 34. The transmission power control unit 44 controls transmission power to obtain desired communication quality.

The transmission power control unit 44 can control the transmission power on the basis of a result of information processing executed by the transmission power control unit 44 itself. In addition, the transmission power control unit 44 may receive a command regarding the transmission power from the centralized control device 24, and in that case, controls the transmission power in accordance with the received command. A control command of the transmission power control unit 44 is provided to the transmission signal amplifier 34 and is provided to a transmission power information notification unit 46.

The transmission power information notification unit 46 provides a command value of the transmission power to the information bit generation unit 42. Then, the information bit generation unit 42 generates bit information regarding current transmission power and includes the information in transmission data. As a result, from the base station 20 of the present embodiment, with transmission power set by the transmission power control unit 44, a transmission signal including information on the transmission power is transmitted toward the terminal station 22.

The base station 20 includes a reception unit illustrated in the lower part of FIG. 7. The reception unit includes a reception signal amplification unit 48 that receives supply of a reception signal from the antenna 36. The reception signal amplification unit 48 amplifies a received signal with an appropriate gain and provides the amplified signal to an analog-to-digital conversion unit 50.

The analog-to-digital conversion unit 50 is a block for demodulating a reception signal in an analog form into a digital signal. The signal digitized by the analog-to-digital conversion unit 50 is provided to a data signal equalization unit 52.

The data signal equalization unit 52 is a block that performs inverse calculation on information on an amplitude and a phase of a communication path response to obtain an estimated value of the transmission signal. A training signal is exchanged between the base station 20 and the terminal station 22 prior to the data signal. Content of the training signal is shared in advance between the base station 20 and the terminal station 22. For this reason, the base station 20 can detect an influence caused by a communication path on the basis of the actually received training signal. Specifically, the data signal equalization unit 52 generates a data signal in which the influence caused by the communication path is offset by reflecting a result of the training in the data signal received from the terminal station 22.

The data signal generated by the data signal equalization unit 52 is provided to a likelihood calculation unit 54. The likelihood calculation unit 54 calculates a likelihood for a signal point on a constellation stored in the likelihood calculation unit 54 itself for a reception point indicated by the data signal. Then, a signal point at which the highest likelihood is obtained is recognized as a symbol intended by the reception point of this time.

A signal symbolized by the likelihood calculation unit 54 is provided to an information bit detection unit 56. The information bit detection unit 56 detects received bits from the symbolized signal. In addition, the information bit detection unit 56 may have an error correction decoding function or an interleaving function as necessary in accordance with the information bit generation unit 42.

Figure 8:
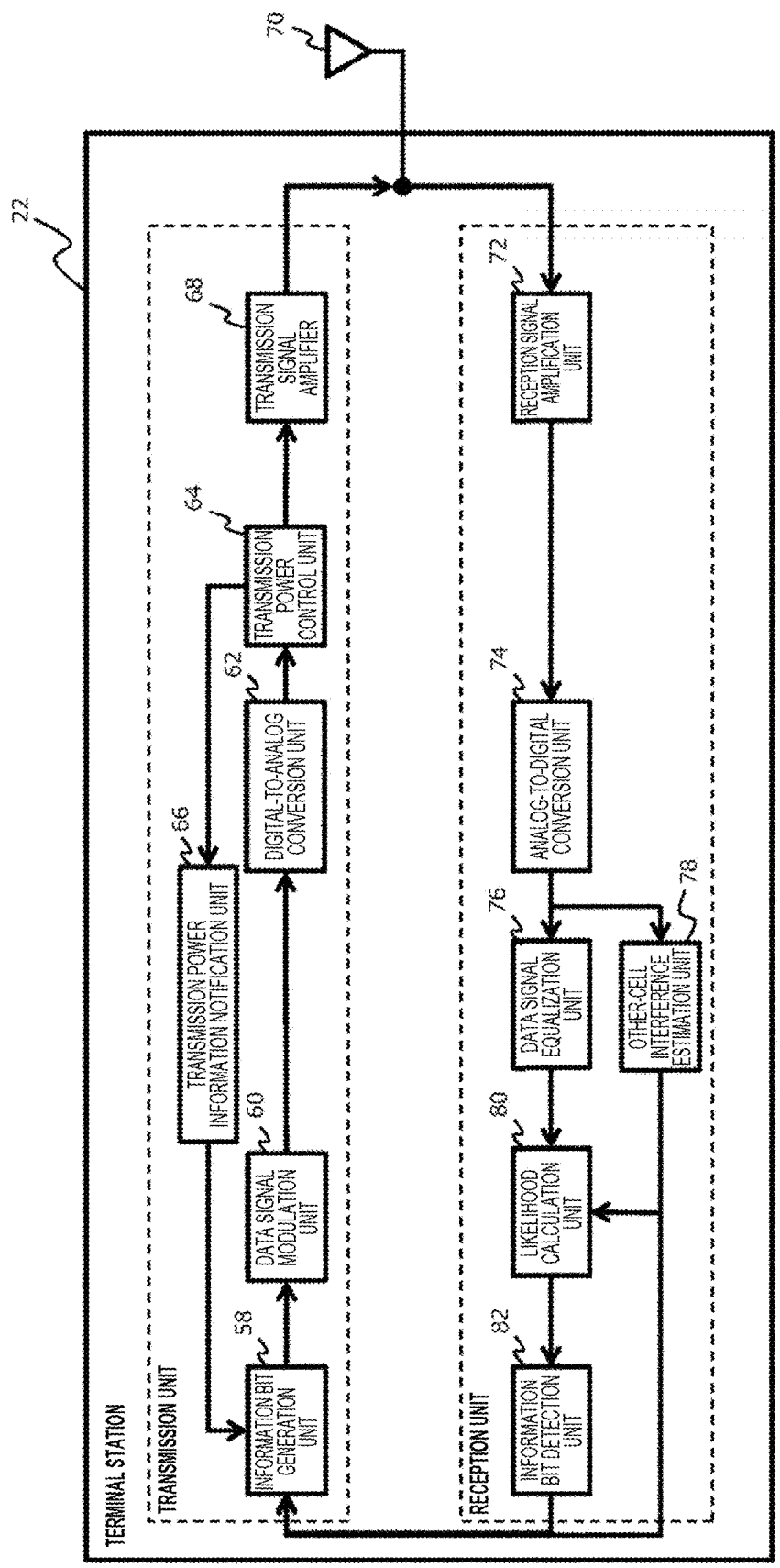
FIG. 8 is a block diagram for explaining a configuration of a terminal station in the first embodiment of the present disclosure.

FIG. 8 is a block diagram for explaining a configuration of the terminal station 22 in the present embodiment. The terminal station 22 includes elements that function substantially similarly to the elements included in the base station 20 in many parts.

Specifically, a transmission unit of the terminal station 22 has a configuration for functioning substantially similarly to the transmission unit of the base station 20 except that the transmission power control unit 64 does not receive a command from the centralized control device 24. In addition, a reception unit of the terminal station 22 has a configuration for functioning substantially similarly to the reception unit of the base station 20 except for an other-cell interference estimation unit 78, a likelihood calculation unit 80, and an information bit detection unit 82.

The other-cell interference estimation unit 78 detects magnitudes of interference signals received from other base stations 20 except the base station 20 of the communication partner. Information on the detected interference signal is provided to the likelihood calculation unit 80 and is provided to an information bit generation unit 58 for feedback to the base station 20.

The likelihood calculation unit 80 calculates a likelihood of the reception point on the basis of the transmission power of the base station 20 and the interference power from other cells. Specifically, the likelihood calculation unit 80 first specifies a constellation of a reception signal on the basis of specification information on the base station 20 acquired at the start of communication and the current transmission power received together with the data signal (see FIG. 5).

The modulation scheme used by the base station 20 and the input-output characteristic of the transmission signal amplifier 34 are known information for the terminal station 22. Then, if these pieces of information are known, if the actually used transmission power is known, it is possible to reproduce the constellation of the reception signal, including those with distortion. When this processing is ended, the likelihood calculation unit 80 then performs likelihood calculation for the reception points 38 reflecting the training result, by using a selected constellation.

Figure 9:
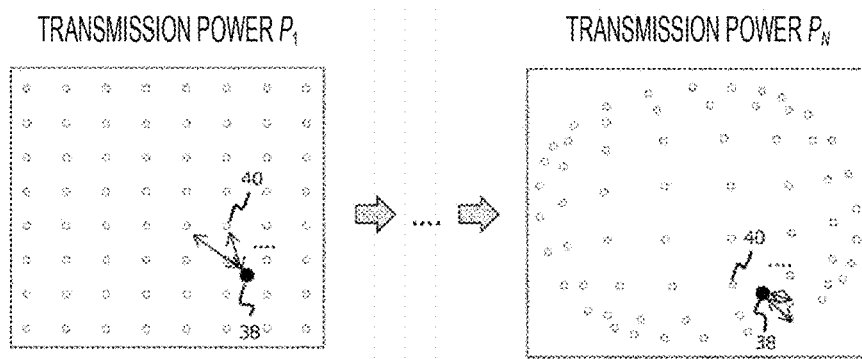
FIG. 9 is a diagram for explaining a method in which the terminal station in the first embodiment of the present disclosure calculates a likelihood for the reception point.

FIG. 9 is a diagram for explaining an outline of likelihood calculation in the present embodiment. The left side of FIG.

9 illustrates an outline of the likelihood calculation of a case where the transmission power is $P_1$. In this case, the constellation of the reception signal has no distortion in which the signal points 40 are correctly arranged in a lattice pattern. The likelihood calculation unit 54 refers to the constellation, and calculates, for some of the signal points 40 located in the vicinity of the reception point 38, a likelihood by using a normal distribution for the Euclidean distance between the reception point 38 and each signal point 40. Then, the signal point 40 at which the maximum likelihood is obtained is adopted as a symbol corresponding to the reception point 38.

The right side of FIG. 9 illustrates an outline of the likelihood calculation of a case where the transmission power is $P_N$. In this case, the constellation of the reception signal includes a deviation caused by the non-linearity of the transmission signal amplifier 34 at each of the signal points 40. The likelihood calculation unit 54 calculates a likelihood for the reception point 38 by a method similar to the above by referring to the constellation with the deviation. Then, on the basis of a result of calculation, the symbol meant by the reception point 38 is specified.

Figure 10:
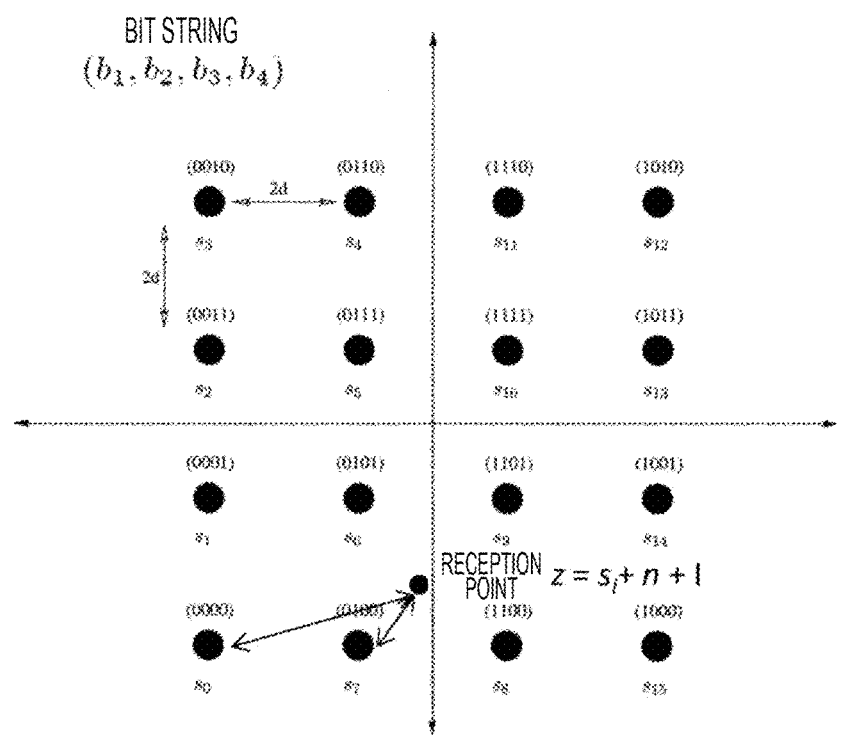
FIG. 10 is a diagram for explaining a method in which the terminal station in the first embodiment of the present disclosure reflects interference power from other cells in the likelihood.

FIG. 10 is a diagram for explaining a method for reflecting an influence of interference power from other cells in the likelihood. Hereinafter, as an example, a case will be described where the likelihood is calculated for a signal point of a constellation without distortion used in 16 quadrature amplitude modulation (QAM).

In the present embodiment, the likelihood calculation unit 80 of the terminal station 22 defines a reception point in a form of z=si+n+I. Here, si is a coordinate point represented by a reception signal, n is additional noise, and I is a factor representing interference power from other cells. Since the factor of the interference power I is added to the coordinate point si together with the additional noise n, a Euclidean distance from a reception point z increases for all signal points as compared with a case where the interference power I is not considered.

For this reason, in a case where the influence of the interference power is small, a relatively large likelihood is obtained for all signal points located around the reception point z. Then, a signal point indicating the maximum likelihood among them is recognized as a symbol. In this case, erroneous recognition of data due to the interference power is unlikely to occur.

In a case where the influence of the interference power is large, a relatively small likelihood is obtained for all the signal points located around the reception point z. Then, a signal point indicating the maximum likelihood among them is recognized as a symbol. Also in this case, since the likelihood uniformly decreases, erroneous recognition of data due to the interference power is unlikely to occur.

As described above, according to the wireless communication system of the present embodiment, it is possible to cause the base station 20 to transmit a high-power transmission signal by using the non-linear region of the transmission signal amplifier 34. In addition, by transferring the specification of the transmission signal amplifier 34 to the terminal station 22 at the start of communication, a distorted constellation corresponding to the non-linear region can be reproduced in the terminal station 22 without requiring subsequent large information provision. Then, by causing the likelihood calculation to be executed by using the constellation, it is possible to prevent data from being erroneously recognized also for a transmission signal using the non-linear region. Further, since the likelihood is calculated by adding the factor of the interference power I from other cells to the additional noise n, it is possible to prevent only the likelihood for a specific signal point from increasing or decreasing due to the influence of the interference power. Therefore, according to the wireless communication system of the present embodiment, it is possible to ensure a high data rate without causing erroneous transmission of data even in a dense environment while utilizing the non-linear region of the transmission signal amplifier 34.

In the present embodiment, the information bit detection unit 82 of the terminal station 22 has a function similar to that of the information bit detection unit 56 of the base station 20, and has a function of converting information regarding a bit error rate (BER) of a signal into bits. Then, the information on BER is provided to the information bit generation unit 58 of the transmission unit.

To provide the information on BER to the base station 20 of the communication partner, the information bit generation unit 58 of the terminal station 22 performs bit generation processing to include the information in the transmission signal. As a result, in the present embodiment, the information on BER achieved by the transmission power currently used by the base station 20 is provided from the terminal station 22 to the base station 20.

The information on BER provided to the base station 20 is provided to the centralized control device 24. Then, the centralized control device 24 controls the transmission power of each base station 20 on the basis of the information on BER so that overall optimization of communication related to the subordinate base station 20 is achieved.

[Control by Centralized Control Device]

In the present embodiment, the centralized control device 24 includes an arithmetic processing unit and a memory device. A program to be executed by the arithmetic processing unit is recorded in the memory device. This program can be installed in the centralized control device 24 by downloading. In addition, this program may be installed in the centralized control device 24 via a recording medium recording the program.

Figure 11:
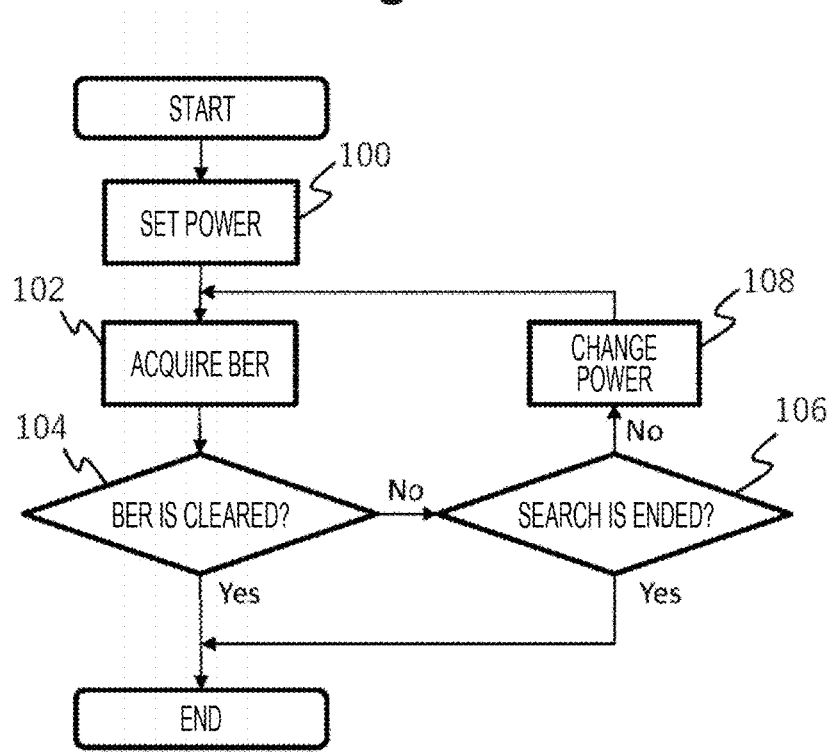
FIG. 11 is a flowchart for explaining an example of a flow of processing executed by a centralized control device in the first embodiment of the present disclosure to control transmission power of the base station.

FIG. 11 is a flowchart for explaining an example of processing executed by the centralized control device 24 in accordance with the above program. A routine illustrated in FIG. 11 is repeatedly activated at predetermined intervals while communication is performed in any of the base stations 20 belonging to subordination to the centralized control device 24.

In the routine illustrated in FIG. 11, first, transmission power for each of the subordinate base stations 20 is set (step 100). Here, as an example, it is assumed that three base stations 20 are present in subordination to the centralized control device 24, and each base station 20 has a function of switching the transmission power in four levels. In step 100, an initial setting transmission power pattern is set in accordance with a rule determined in advance.

When the processing of step 100 ends, a command for the set transmission power is given to all the subordinate base stations 20. As a result, communication by the transmission power set by the centralized control device 24 is started in the subordinate base station 20.

When the communication is started, the information on BER is provided from the terminal station 22 of a communication partner to the subordinate base station 20. The centralized control device 24 collects the information on BER via the base station 20 (step 102).

Next, it is determined whether or not collected BER clears a requirement condition set in advance (step 104). For example, it is determined whether the error rate BER is less than or equal to a requirement threshold for all communications related to the subordinate base station 20. As a result, in a case where it is determined that BER is less than or equal to the requirement threshold, it can be determined that the current transmission power pattern is appropriate. In this case, the routine of this time is ended while the transmission power is maintained.

On the other hand, in a case where it is determined in step 104 that BER does not clear the requirement, it can be determined that the current transmission power pattern does not achieve overall optimization. In this case, next, it is determined whether or not search is ended for all combinations of transmission power (step 106). If there are three base stations 20 and there are four levels of transmission power, it is determined whether or not the search is ended for $4^3=64$ combinations.

As a result, in a case where it is determined that search is ended for all the combinations, the routine of this time is ended, and the processing of step 100 and subsequent steps is started again. On the other hand, in a case where it is determined that search is not ended for all, the transmission power pattern is changed in accordance with a rule determined in advance (step 108). Thereafter, until determination of BER clear is obtained in step 104, the transmission power pattern is changed, and the processing of step 102 and subsequent steps is repeated.

If the transmission power of one base station 20 increases, for the base station 20, an SNR is improved while distortion of the constellation increases. In addition, the interference power caused by the base station 20 increases. On the other hand, if the transmission power of one base station 20 decreases, an SNR related to the base station 20 deteriorates, but distortion of the constellation and the interference power caused by the base station 20 decrease. As a result, the increase or decrease in the transmission power of one base station 20 gives advantages and disadvantages to quality of communication related to the base station 20 and communication related to other base stations 20. Then, in the present embodiment, by repeating trials with various transmission power patterns, it is possible to search for a transmission power pattern that achieves overall optimization.

[Modification of First Embodiment]

By the way, in the routine illustrated in FIG. 11 described above, when a transmission power pattern is found in which BER clears a desired requirement, pattern search is ended. However, the present disclosure is not limited thereto. For example, even after a condition for clearing a requirement for BER is found, the search may be continued to find an optimal transmission power pattern.

Figure 12:
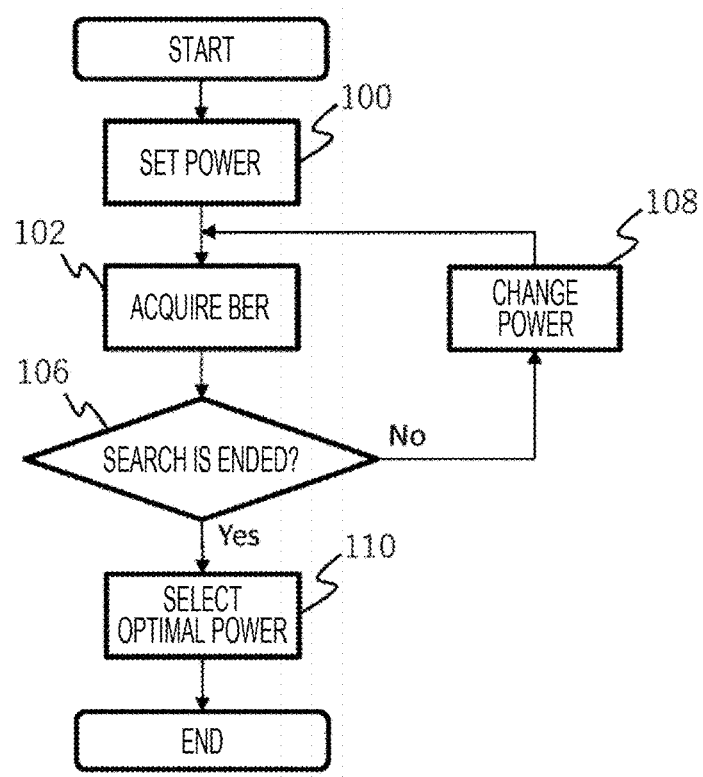
FIG. 12 is a flowchart for explaining a modification of the flow of the processing executed by the centralized control device in the first embodiment of the present disclosure to control the transmission power of the base station.

FIG. 12 is a flowchart for explaining a flow of processing to be executed by the centralized control device 24 to implement operation of the above modification. Note that, in FIG. 12, a step of executing processing similar to a step illustrated in FIG. 11 is denoted by the same reference signs, and description thereof will be omitted or simplified.

In a routine illustrated in FIG. 12, the processing of step 106 is executed subsequent to step 102. Then, until it is determined in step 106 that the search is ended, the transmission power pattern is changed (step 108), and acquisition of BER is repeated (step 102).

When the search is ended for all combinations and determination at step 106 is positive, then an optimal transmission power pattern is selected (step 110). Here, specifically, from results of BERs accumulated by repeating step 102, a combination is selected in which all communications clear the requirement and a sum of BERs is minimized.

Then, when a command for the selected transmission power pattern is given to each of the base stations 20, the routine of this time is ended.

According to the above processing, it is possible to search for a transmission power pattern in which all communications executed in subordination to the centralized control device 24 satisfy the requirement and the best communication quality is provided to the entire wireless communication system. Therefore, according to the above modification, a higher data rate can be ensured as compared with the case of the first embodiment.

Note that, in the first embodiment described above, the base station 20 provides the specification of the transmission signal amplifier 34 to the terminal station 22 at the start of wireless communication. However, the present disclosure is not limited thereto. For example, the base station 20 may be caused to store the terminal station 22 to which the specification is provided, and the terminal station 22 to which the specification is provided may be caused to store information on the specification. Then, transmission and reception of the above specification may be omitted for the second and subsequent communications between the base station 20 and the terminal station 22.

In addition, in the first embodiment described above, the base station 20 provides, to the terminal station 22, information on the modulation scheme used for the wireless communication together with the specification of the transmission signal amplifier 34. However, the present disclosure is not limited thereto. For example, in a case where the modulation scheme used for communication between the base station 20 and the terminal station 22 is determined in advance, provision of information on the modulation scheme can be omitted.

REFERENCE SIGNS LIST 20, 20-1 to 20-3 Base station
22, 22-1 to 22-3 Terminal station
24 Centralized control device
34, 68 Transmission signal amplifier
42, 58 Information bit generation unit
44, 64 Transmission power control unit
46, 66 Transmission power information notification unit
54, 80 Likelihood calculation unit
78 Other-cell interference estimation unit
82 Information bit detection unit

The invention claimed is:

1. A wireless communication system comprising a plurality of base stations and terminal stations that perform wireless communication by using a single-carrier multi-value modulation scheme, wherein:
   each of the base stations includes
      a transmission signal amplifier enabled to vary transmission power, and is configured to:
         provide a specification regarding an input-output characteristic of the transmission signal amplifier to each of the terminal stations; and
         provide transmission power used for data transmission to each of the terminal stations, and
   each of the terminal stations is configured to execute:
      estimate a constellation of signal points on a basis of the transmission power and the specification;
      detect a coordinate point on constellation coordinates, of a reception signal;
      detect interference power received from a base station that is not a communication partner;

calculate a reception point in which an influence of the interference power is reflected on the coordinate point;
calculate likelihood with the signal points for the reception point; and
specify a symbol intended by the reception signal on a basis of a calculation result of the likelihood.

2. The wireless communication system according to claim 1, further comprising;
a centralized controller that gives a command for transmission power to each of the plurality of base stations, wherein
each of the terminal stations is further configured to:
calculate an error rate of a reception signal; and
provide the error rate to each of the base stations, and
the centralized controller is configured to:
change patterns of transmission power for the plurality of base stations;
collect the error rate corresponding to each of the patterns from each of the terminal stations via a corresponding one of the base stations; and
determine the command for transmission power to be given to each of the plurality of base stations on a basis of the error rate collected.

3. The wireless communication system according to claim 2, wherein:
to collect the error rate, the centralized controller is configured to collect error rates for all communications to which the base stations controlled by the centralized controller are related, and
to determine the command for transmission power, the centralized processor is configured to:
determine whether or not the error rates satisfy a predetermined requirement;
search for a pattern of transmission power in which all of the error rates satisfy the predetermined requirement; and
give the command for transmission power to the plurality of base stations in accordance with a pattern obtained as a result of the searching.

4. The wireless communication system according to claim 3, wherein:
to collect the error rate, the centralized processor is further configured to collect the error rates for all patterns of transmission power possible in the plurality of base stations, and
to determine the command for transmission power, the centralized processor is further configured to:
select an optimal pattern in accordance with a predetermined rule among patterns of transmission power in which all of the error rates satisfy the predetermined requirement; and
give the command for transmission power to the plurality of base stations in accordance with the optimal pattern.

5. A wireless communication method using a plurality of base stations and terminal stations that perform wireless communication by using a single-carrier multi-value modulation scheme,
each of the base stations including a transmission signal amplifier enabled to vary transmission power,
the wireless communication method comprising:
providing a specification regarding an input-output characteristic of the transmission signal amplifier from each of the base stations to each of the terminal stations;
providing transmission power used by each of the base stations for data transmission to each of the terminal stations;
causing each of the terminal stations to estimate a constellation of signal points on a basis of the transmission power and the specification;
causing each of the terminal stations to detect a coordinate point on constellation coordinates, of a reception signal;
causing each of the terminal stations to detect interference power received from a base station that is not a communication partner;
causing each of the terminal stations to calculate a reception point in which an influence of the interference power is reflected on the coordinate point;
causing each of the terminal stations to calculate likelihood with the signal points for the reception point; and
causing each of the terminal stations to specify a symbol intended by the reception signal on a basis of a calculation result of the likelihood.

6. The wireless communication method according to claim 5, further comprising:
giving a command for transmission power to each of the plurality of base stations;
calculating an error rate of a reception signal in each of the terminal stations;
changing patterns of transmission power for the plurality of base stations;
collecting the error rate corresponding to each of the patterns; and
determining the command for transmission power to be given to each of the plurality of base stations on a basis of the error rate collected.

7. A centralized controller that controls a wireless communication system including a plurality of base stations and terminal stations that perform wireless communication by using a single-carrier multi-value modulation scheme, wherein:
each of the base stations includes a transmission signal amplifier enabled to vary transmission power, and is configured to:
provide a specification regarding an input-output characteristic of the transmission signal amplifier to each of the terminal stations; and
provide transmission power used for data transmission to each of the terminal stations, and
each of the terminal stations is configured to:
estimate a constellation of signal points on a basis of the transmission power and the specification;
detect a coordinate point on constellation coordinates, of a reception signal;
detect interference power received from a base station that is not a communication partner;
calculate a reception point in which an influence of the interference power is reflected on the coordinate point;
calculate likelihood with the signal points for the reception point;
specify a symbol intended by the reception signal on a basis of a calculation result of the likelihood; and
calculate an error rate of the reception signal,
the centralized controller being configured to:
change patterns of transmission power for the plurality of base stations;
collect the error rate corresponding to each of the patterns; and determine a command for transmission power to be given to each of the plurality of base stations such that all of the error rates collected satisfy a predetermined requirement.

8. A non-transitory storage medium storing a computer readable wireless communication program for implementing the centralized controller according to claim 7, the wireless communication program comprising a program for causing one or more processor included in the centralized controller to:

change patterns of transmission power for the plurality of base stations;

collect the error rate corresponding to each of the patterns; and determine the command for transmission power to be given to each of the plurality of base stations such that all of the error rates collected satisfy a predetermined requirement.

* * * * *